(12) United States Patent
Arai

(10) Patent No.: US 8,096,661 B2
(45) Date of Patent: Jan. 17, 2012

(54) PROJECTOR HAVING A CROSS-SHAPED LIGHT BEAM

(75) Inventor: Kazuhiro Arai, Daito (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 813 days.

(21) Appl. No.: 11/819,528

(22) Filed: Jun. 28, 2007

(65) Prior Publication Data

US 2008/0012998 A1 Jan. 17, 2008

(30) Foreign Application Priority Data

Jun. 29, 2006 (JP) .................................. 2006-179446
Jun. 28, 2007 (JP) .................................. 2007-170771

(51) Int. Cl.
*G03B 21/14* (2006.01)

(52) U.S. Cl. .......................................... 353/20; 353/97

(58) Field of Classification Search .................. 353/20, 353/85, 94, 97–98, 122; 362/555, 612
See application file for complete search history.

(56) References Cited

U.S. PATENT DOCUMENTS

| | | | | | |
|---|---|---|---|---|---|
| 2,623,180 | A | * | 12/1952 | Zurli et al. ..................... | 378/206 |
| 4,671,165 | A | * | 6/1987 | Heidmann et al. ............. | 89/41.19 |
| 5,128,786 | A | * | 7/1992 | Yanagisawa .................... | 349/111 |
| 6,631,997 | B2 | * | 10/2003 | Miyata et al. .................... | 353/97 |
| 6,953,252 | B2 | * | 10/2005 | Way .................................. | 353/99 |
| 7,084,405 | B1 | * | 8/2006 | Malyutenko et al. ..... | 250/370.08 |
| 7,086,737 | B2 | * | 8/2006 | Kitabayashi .................... | 353/31 |
| 7,126,736 | B2 | | 10/2006 | Itoh et al. | |
| 2005/0157263 | A1 | * | 7/2005 | Sakata et al. .................... | 353/20 |
| 2005/0179869 | A1 | * | 8/2005 | Shin et al. ........................ | 353/20 |
| 2006/0146560 | A1 | * | 7/2006 | Lewin et al. .................. | 362/560 |
| 2009/0201469 | A1 | * | 8/2009 | Vissenberg et al. ............. | 353/97 |

FOREIGN PATENT DOCUMENTS

| | | | |
|---|---|---|---|
| DE | 19829138 A1 | * | 1/2000 |
| JP | 58142208 A | * | 8/1983 |
| JP | 61289785 A | * | 12/1986 |
| JP | 04-249233 A | | 9/1992 |
| JP | 2000-180794 | | 6/2000 |
| JP | 2003-084379 A | | 3/2003 |
| JP | 2003-207741 A | | 7/2003 |
| JP | 2004-233950 A | | 8/2004 |
| JP | 2004-281103 A | | 10/2004 |
| JP | 2004-286858 A | | 10/2004 |
| JP | 2005-017500 A | | 1/2005 |
| JP | 2005-331667 A | | 12/2005 |
| JP | 2006-301363 A | | 11/2006 |
| JP | 2007-183450 A | | 7/2007 |

* cited by examiner

*Primary Examiner* — Tony Ko
*Assistant Examiner* — Jori S Reilly-Diakun
(74) *Attorney, Agent, or Firm* — Marvin A. Motsenbocker; Mots Law, PLLC

(57) ABSTRACT

A projection-type image display apparatus including: a light source unit; an optical modulator including an incident surface and an output surface both being perpendicular to an optical axis of a light beam emitted from the light source, and configured to modulate a light beam emitted from the light source; a first polarizer provided to a surface of the optical modulator; and a second polarizer provided to another surface of the optical modulator. In the projection-type image display apparatus, the polarization direction of a light beam allowed to pass through the first polarizer and the polarization direction of a light beam allowed to pass through the second polarizer are substantially orthogonal to each other, and the light source unit emits a cross shaped light beam.

6 Claims, 11 Drawing Sheets

TRANSMISSION POLARIZATION DIRECTION

PROJECTOR HAVING A CROSS-SHAPED LIGHT BEAM

CROSS REFERENCE TO RELATED APPLICATIONS

This application is based upon and claims the benefit of priority from prior Japanese Patent Application No. 2006-179446, filed on Jun. 29, 2006; and Japanese Patent Application No. 2007-170771, filed on Jun. 28, 2007; the entire contents of which are incorporated herein by reference.

BACKGROUND OF THE INVENTION

1. Field of the Invention

The present invention relates to a projection-type image display apparatus including a light source unit and an optical modulator configured to modulate a light beam emitted from the light source unit.

2. Description of the Related Art

Conventionally, there has been widely known a projection-type image display apparatus (a liquid crystal projector, for example) including: a light source configured to emit a rectangular or circular light beam; an optical modulator (hereinafter, referred to as a "liquid crystal panel") configured to modulate the light beam emitted from the light source; and a projection lens configured to enlarge the light beam outputted from the liquid crystal panel and then to project the light beam on a screen.

In general, in a light beam emitted from a light source, the center portion of the light beam is brighter than that of the portion surrounding the center portion. For this reason, when a liquid crystal panel is directly radiated with the light beam from the light source, the illuminance distribution of the light beam radiated on the liquid crystal panel becomes uneven. In other words, the illuminance distribution of the light beam radiated on the screen becomes uneven.

For this reason, the aforementioned projection-type image display apparatus includes a pair of fly-eye lenses each having micro lenses arranged in an array, and a condenser lens configured to condense, on the entire liquid crystal panel, the light beams collected by the micro lenses.

Thus, the condenser lens causes the light beams collected by the micro lenses to overlap with one another on the entire liquid crystal panel. This results in obtaining evenness in the illuminance distribution of the light on the screen, and the minimized color irregularities of video displayed on the screen (refer to Optical Society of Japan, Japan Kogaku (Japanese Journal of Optics) "Kogaku-Ekisho projector no Kougakukei (Optics System of Liquid Crystal Projector)" vol. 32 (2002) (hereinafter, referred to as "Non-patent Document 1").

In general, a liquid crystal panel includes a pair of polarizers (an incident side polarizer and an output side polarizer) to obtain black and white contrast. Specifically, each of the polarizers has a characteristic of allowing a light beam in a first polarization direction to pass through while not allowing a light beam in a second direction orthogonal to the first direction to pass through. Furthermore, the first polarization direction of a light beam allowed to pass through a first polarizer (hereinafter, referred to as a "light transmitting polarization direction" or a "transmission axis") is orthogonal to the second polarization direction of a light beam allowed to pass through a second polarizer (hereinafter, referred to as a "light transmitting polarization direction" or a "transmission axis"). Specifically, the polarizing direction of a light beam not allowed to pass through the first polarizer (hereinafter, referred to as a "light absorbing polarization direction" or an "absorb axis") is orthogonal to the polarizing direction of a light beam not allowed to pass through the second polarizer (hereinafter, referred to as a "light absorbing polarization direction" or an "absorb axis").

Incidentally, when natural light (random polarization) enters the incident side polarizer of a liquid crystal panel, half of the light is lost (in theory). For this reason, there has been known a liquid crystal display device, provided with polarization conversion means having a PBS array or the like, disposed between the incident side polarizer and the light source. In this liquid crystal display apparatus, the polarization conversion means causes natural light to enter the polarizer, after changing the polarization direction of the natural light to match with the light transmitting polarization direction of the polarizer on the incident light side, to improve the light utilization efficiency (Japanese Patent Publication No. 2000-180794, for example).

However, although the directions of light beams entering the incident side polarizer are aligned with one another by the aforementioned polarization conversion means, the light beams entering the incident side polarizer include a light entering the incident side polarizer from an oblique direction, such as a light beam not in parallel with the optical axis. The presence of such a light beam results in reduction of black and white contrast.

Specifically, consider a case where an angle formed by the absorb axis of the incident polarizer and the projection vector on the incident side polarizer of a light beam entering the incident side polarizer is large, and where an angle formed by the projection vector and the transmission axis of the incident polarizer (that is, the absorb axis of the output polarizer) is also large. In this case, the transmissivity of a light beam passing through the aforementioned pair of polarizers increases since sufficient extinction under crossed Nicols cannot be obtained. Moreover, in a case where an angle (an incident angle) formed by a light beam entering the incident side polarizer and the optical axis (a line perpendicular to the incident surface of the incident side polarizer) is large, black and white contrast is reduced since the transmissivity of a light beam passing through the pair of the polarizers increases.

In addition, as disclosed in Non-patent Document 1, in a case where an optical system using fly-eye lenses is employed, light beams from various directions enter the incident surface of the incident side polarizer. This is because each of the fly-eye lenses is provided so as to cause the light beams collected by the micro lenses of the fly-eye lens to overlap with one another, on the entire liquid crystal panel. Accordingly, light beams enter the incident surface of the polarizer from various directions. This makes prominent the reduction in contrast caused by an increase in the transmissivity of the light beam passing through the pair of polarizers.

SUMMARY OF THE INVENTION

An aspect of the present invention is to provide a projection-type image display apparatus including: a light source unit (light source unit 10); an optical modulator (liquid crystal panel 50) configured to include an incident surface (light incident surface 51a) and an output surface (light output surface 51b) both being substantially perpendicular to an optical axis of a light beam emitted from the light source, and configured to modulate a light beam emitted from the light source; a first polarizer provided to the incident surface of the optical modulator (polarizer 52); and a second polarizer provided to the output surface of the optical modulator (polarizer 53). In the projection-type image display apparatus, the polarization direction of a light beam allowed to pass through the first polarizer and the polarization direction of a light beam allowed to pass through the second polarizer are substantially orthogonal to each other or are substantially matched with each other, and the light source unit emits a cross shaped light beam.

According to the aforementioned aspect of the present invention, since the light source emits a cross shaped light beam, it is possible to reduce the size of the maximum incident angle of a light beam having a 45/135° component, the light beam entering the first polarizer (or the second polarizer). Thereby, the projection-type image display apparatus is capable of achieving an improvement in black and white contrast.

In the aforementioned aspect of the invention, the projection-type image display apparatus of the invention further includes: a fly-eye lens (fly-eye-lens 21) including a plurality of micro lenses (micro lenses 21*a*) arranged in an array, and configured to collect light beams emitted from the light source unit; a polarization conversion device (polarization conversion device 30) configured to align the polarization directions of light beams collected by the plurality of micro lenses into a certain polarization direction; and a condenser lens (condenser lens 40) configured to condense, on the incident surface of the optical modulator, the light beams with the polarization directions aligned in the certain direction by the polarization conversion device. In the projection-type image display apparatus, the light source unit is configured to emit a cross shaped light beam onto the condenser lens.

In the aforementioned aspect of the invention, the light source unit includes: a light source (light source 11) configured to emit a light beam; a reflector (reflector 12) configured to reflect a light beam emitted from the light source to the optical modulator side; and a cross shaped mask (cross shaped mask 13) configured to have a cross shaped light transmission area, arranged between the light source and the optical modulator on the optical axis of a light beam emitted from the light source. In the projection-type image display apparatus, the surface of the cross shaped mask facing the reflector is configured of a reflective surface reflecting a light beam.

In the aforementioned aspect of the invention, the light source unit is configured of a plurality of solid-state light sources (LEDs 91) arranged in a cross shape.

In the aforementioned aspect of the invention, the light source unit is configured to emit light beams having optical axes each located in one of arms of a crossed shape.

In the aforementioned aspect of the invention, the light source unit is configured to emit a cross shaped light beam extending in the polarization direction of a light beam allowed to pass through the first polarizer and in the polarization direction of a light beam allowed to pass through the second polarizer.

DETAILED DESCRIPTION OF THE EMBODIMENTS

Figure 1:
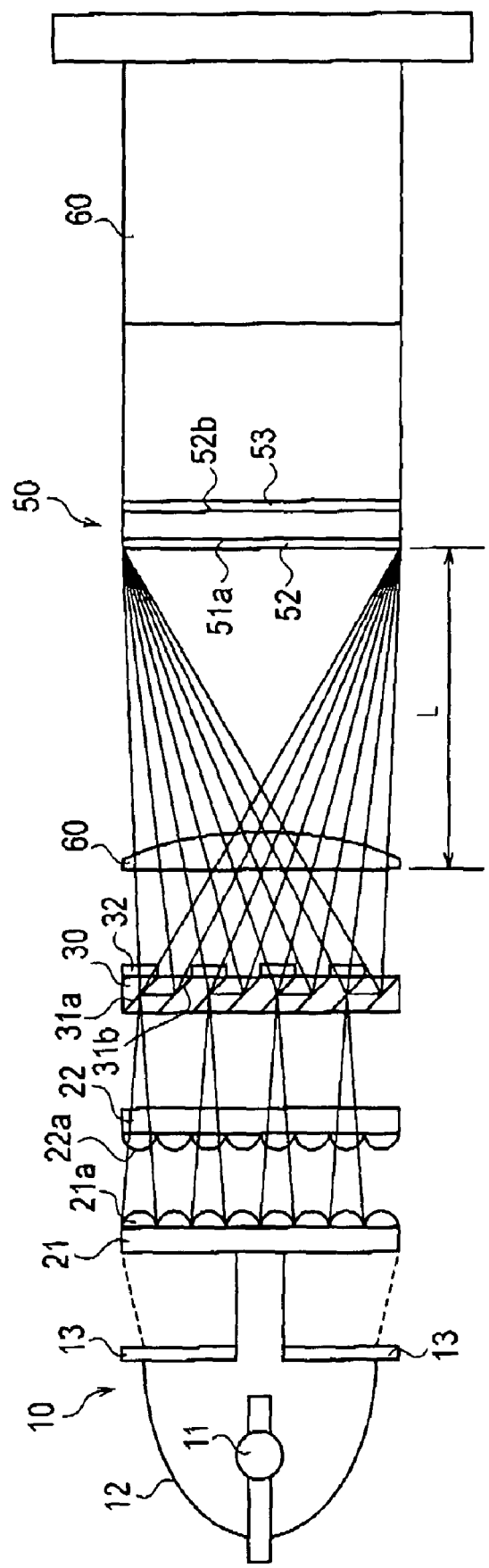
FIG. 1 is a schematic diagram showing a configuration of a projection-type image display apparatus 100 according to a first embodiment of the present invention.

Hereinafter, the embodiments of the present invention will be described with reference to drawings. It should be noted that identical elements are denoted by the identical reference numerals in the descriptions of the drawings below.

Note that, dimensional ratios and others are different from actual ones since the drawings are only schematic representations. It is thus to be understood that specific dimensions and others should be determined in consideration of the descriptions provided below. In addition, it is to be understood that there may be a difference in the relation or ratio between dimensions in the drawings when they are cross-referenced.

First Embodiment (Configuration of Projection-Type Image Display Apparatus)

Hereinafter, a configuration of a projection-type image display apparatus according to a first embodiment of the present invention will be described with reference to drawings. FIG. 1 is a schematic diagram showing the configuration of a projection-type image display apparatus 100 according to the first embodiment of the present invention.

It should be noted that since the projection-type image display apparatus 100 shown in FIG. 1 is a schematic diagram provided for describing the first embodiment of the invention, components such as a dichroic mirror or a dichroic prism which are included in a normal configuration of the projection-type image display apparatus 100 are omitted herein. Examples of the projection-type image display apparatus 100 include a projector, a rear projection television and the like.

As shown in FIG. 1, the projection-type image display apparatus 100 includes a light source unit 10, a pair of fly-eye lenses (fly-eye lenses 21 and 22), a polarization conversion device 30, a condenser lens 40, a liquid crystal panel 50 and a projection lens 60.

The light source unit 10 includes a light source 11, a reflector 12 and a cross shaped mask 13. The light source 11 is a white light source, which emits a white light beam of a circular or rectangular shape, such as a halogen lamp. The reflector 12 is a reflective plate, which reflects a light beam emitted from the light source 11. The reflector 12 reflects, to the condenser lens 40 side (the liquid crystal panel 50), a light beam emitted from the light source 11.

The cross shaped mask 13 are arranged between the light source 11 and the condenser lens 40 (liquid crystal panel 50) on the optical axis of a light beam emitted from the light source 11, having a cross shaped light transmission area. Specifically, the cross shaped mask 13 is configured of a non-light transmissive material and is arranged with a cross shaped space placed at the center of the material. Furthermore, the surface of the cross shaped mask 13, which surface faces the reflector 12 of the light source unit 10, is configured of a reflective surface reflecting a light beam to the reflector 12 side.

Moreover, a part of the light beam emitted from the light source unit 10 which has passed through the cross shaped mask 13 becomes a light beam of a cross shape and extends in the polarizing direction of a light beam allowed to pass through the pair of polarizers (polarizers 52 and 53).

The fly-eye lens 21 includes a plurality of micro lenses 21a arranged in an array Each of the micro lenses 21a collects light to the polarization conversion device 30.

The fly-eye lens 22 includes a plurality of micro lenses 22a arranged in an array. Each of the micro lenses 22a collects light to the polarization conversion device 30. It is to be noted that the light collected by the micro lenses 22a to the polarization conversion device 30 is condensed by the condenser lens 40 to the entire surface of a light incident side surface 51a of the liquid crystal panel 50.

The polarization conversion device 30 is an optical device in which polarization beam splitters (PBS) are arrayed in horizontal and vertical directions. Each of the PBS converts the polarization direction of a light beam emitted from the light source unit 10 to an S polarization and then outputs only the light beam having an S polarization component to the condenser lens 40 side. Specifically, the polarization conversion device 30 includes a PBS surface 31a, a PBS surface 31b and a ½λ retardation film 32.

The PBS surface 31a allows a light beam having a P polarization component to pass through to the ½λ retardation film 32 side and also reflects a light beam having an S polarization component to the PBS surface 31b side. The light beam having an S polarization component reflected by the PBS surface 31a is reflected by the PBS surface 31b to the condenser lens 40 side. The ½λ retardation film 32 converts the polarization direction of the light beam having a P polarization component by 90 degrees, the light beam having passed through the PBS surface 31a, and then outputs the light beam as a light beam having an S polarization component to the condenser lens 40 side.

As described above, the polarization conversion device 30 aligns the polarization directions of light beams emitted by the light source unit 10 into a certain polarization direction.

The condenser lens 40 condenses the light beams collected by the micro lenses 22a of the fly-eye lens 22 to the entire surface of the light incident surface 51a of the liquid crystal panel 50. In other words, the condenser lens 40 condenses the light beams having the polarization directions aligned into a certain polarization direction by the polarization conversion device 30, to the entire surface of the light incident surface 51a of the liquid crystal panel 50.

Specifically, the condenser 40 causes the light beams collected by the micro lenses 22a of the fly-eye lens 22 to overlap with one another on the entire surface of the light incident surface 51a of the liquid crystal panel 50. Thus, features such as uniformity of colors or color irregularities on the light incident surface 51a of the liquid crystal panel 50 improve.

The liquid crystal panel 50 is an optical modulator, which modulates light beams emitted from the light source unit 10, that is, the light beams condensed by the condenser lens 40. Specifically, the liquid crystal panel 50 includes the light incident surface 51a and the light output surface 51b. The light incident surface 51a is a surface to which a light beam enters, and substantially perpendicular to the optical axis of a light beam emitted from the light source unit 10. The light output surface 51b is a surface from which a light beam is outputted, and substantially perpendicular to the optical axis of a light beam emitted from the light source unit 10. Moreover, the light incident surface 51a is provided with a polarizer 52, and the light output surface 51b is provided with a polarizer 53.

The polarizers 52 and 53 include functions of allowing a first light beam in a certain polarization direction to pass through and of not allowing a light beam in a second polarization direction to pass through. Moreover, the polarization direction of a light beam allowed to pass through the polarizer 52 is substantially orthogonal to the polarization direction of a light beam allowed to pass through the polarizer 53. For example, in a case where the polarizer 52 allows a light beam having a P polarization component to pass through (that is, in a case where a light beam having an S polarization component is not allowed to pass through), the polarizer 53 allows a light beam having an S polarization component to pass through (that is, a light beam having a P polarization component is not allowed to pass through).

As described above, the polarization direction of a light beam passing through the polarizer 52 and the polarization direction of a light beam passing through the polarizer 53 are substantially orthogonal to each other. For this reason, unless a voltage is applied to the liquid crystal panel 50, the light beam emitted from the light source unit 10 does not pass through the polarizers 52 and 53. Accordingly, the liquid crystal panel 50 can create black and white contrast.

The projection lens 60 magnifies a light beam emitted from the liquid crystal panel 50 on a screen.

(Configuration of Light Source Unit)

Figure 2:
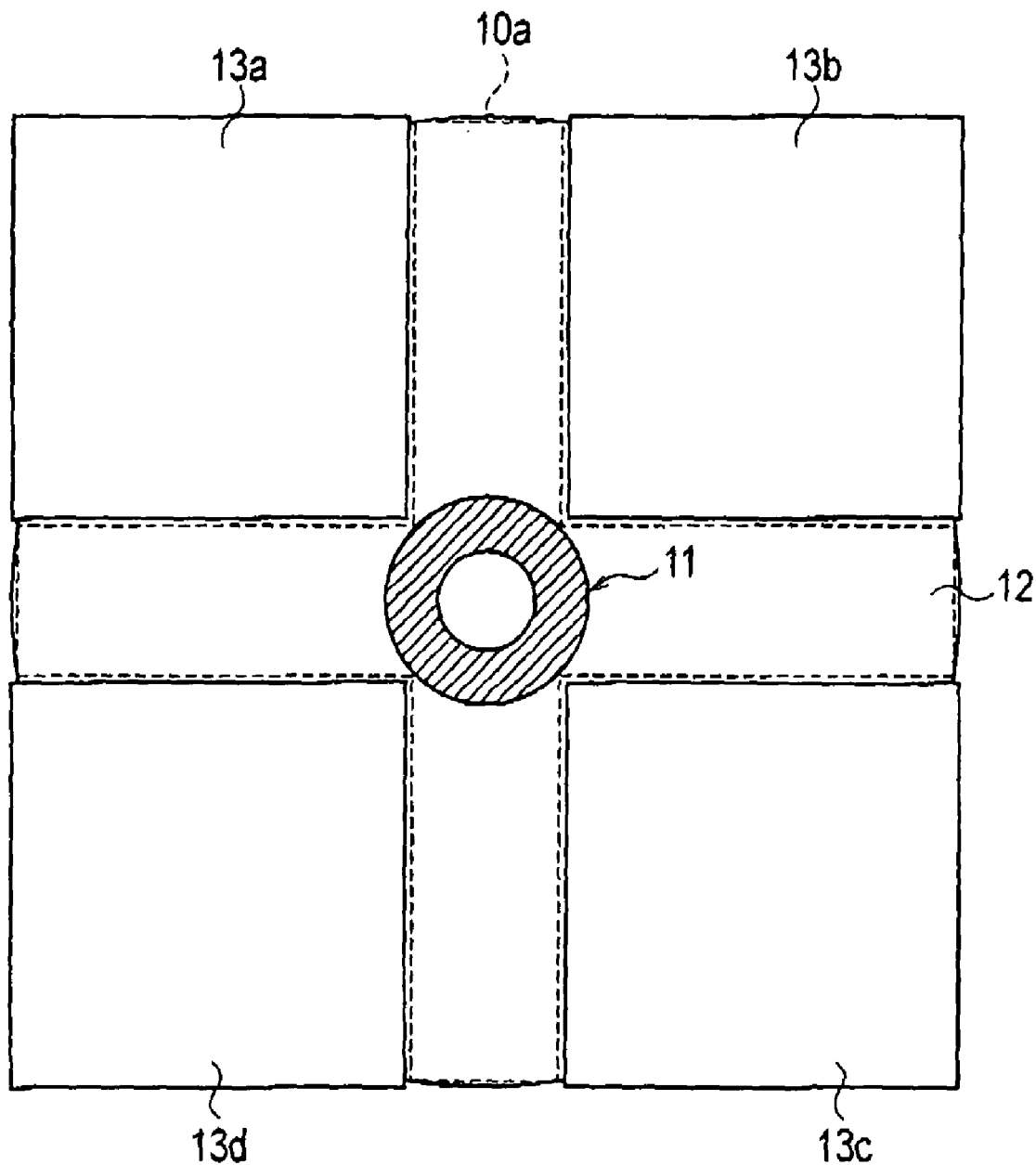
FIG. 2 is a diagram showing a configuration of a light source unit 10 according to the first embodiment of the invention.

Hereinafter, a description will be given of a configuration of the light source unit according to the first embodiment of the invention with reference to drawings. FIG. 2 is a diagram showing a configuration of the light source unit 10 according to the first embodiment of the invention.

As shown in FIG. 2, the light source unit 10 includes the light source 11, the reflector 12 and the cross shaped mask 13 (pieces of cross shaped masks 13a to 13d). In addition, the pieces of cross shaped masks 13a to 13d are arranged in such a manner that a cross shaped space (the light transmission area 10a) is placed at the center of the masks and that the space separates the pieces of cross shaped masks 13 from one another.

It should be noted that a light beam, which is emitted from the light source Unit 10, and which is then formed to be of a cross shape by the pieces of cross shaped masks 13a to 13d, loses its shape as the light expands. However, in the first embodiment, the cross shape of the light beam is retained at least until the light beam reaches the condenser lens 40.

Specifically, the distance between the light source unit 10 and the condenser lens 40 is set so that the cross shape of the light can be retained therebetween.

(Mechanism of Contrast)

Hereinafter, a description will be given of a mechanism of contrast according to the first embodiment of the invention with reference to FIGS. 3A and 3B to 5.

Incidentally, as a factor of reduction in a contrast, factors such as the following are conceivable. Specifically, in a case where an angle formed by the projection vector on the polarizer 52 (incident side polarizer) of a light beam entering the polarizer 52 and the polarization direction of the light beam passing through the polarizer 52 (or 53) (hereinafter, referred to as an "optical transmission polarization direction") is large, sufficient extinction in a crossed Nicols state cannot be obtained. Accordingly, the transmissivity of a light beam passing through the aforementioned pair of the polarizers increases, so that black and white contrast is reduced. Moreover, in a case where an angle (incident angle) formed by a light beam entering the polarizer 52 and the optical axis (the perpendicular line with respect to the incident surface of the polarizer 52) is large, the transmissivity of a light beam passing through the pair of the polarizers increases, so that black and white contrast is similarly reduced.

Figure 3A:
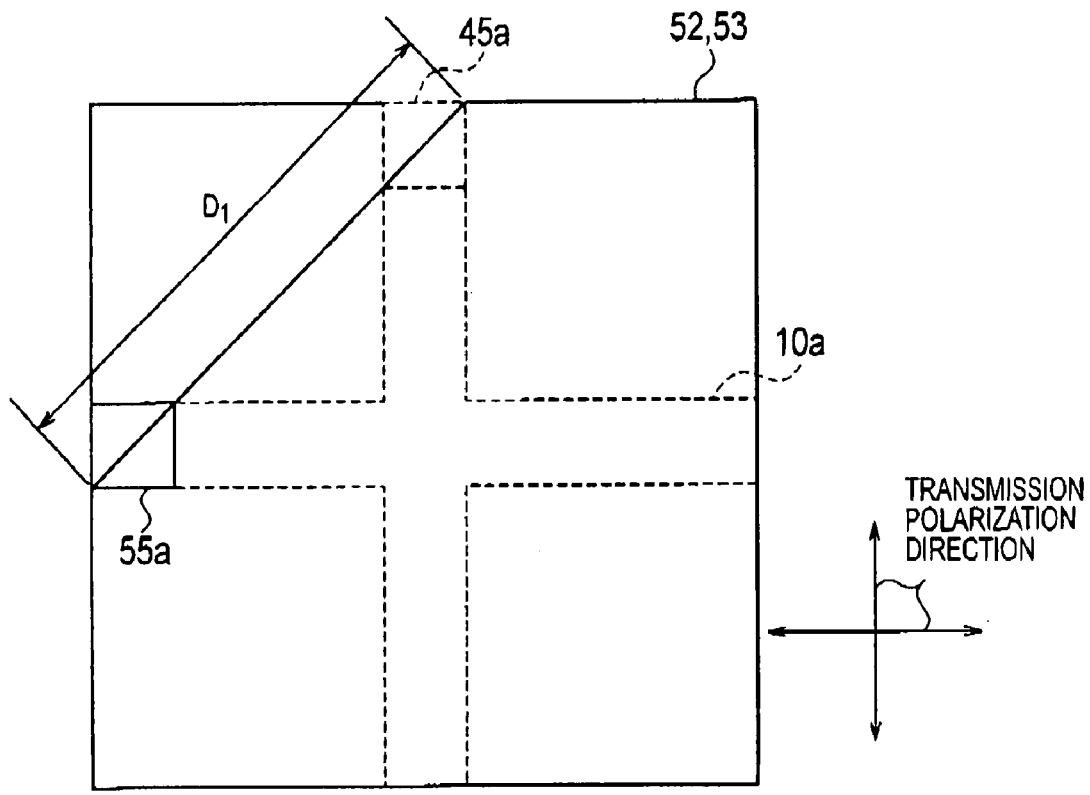
FIGS. 3A and 3B are diagrams for describing light beams each having a 45/135° component according to the first embodiment of the invention and a conventional technique, respectively.
Figure 3B:
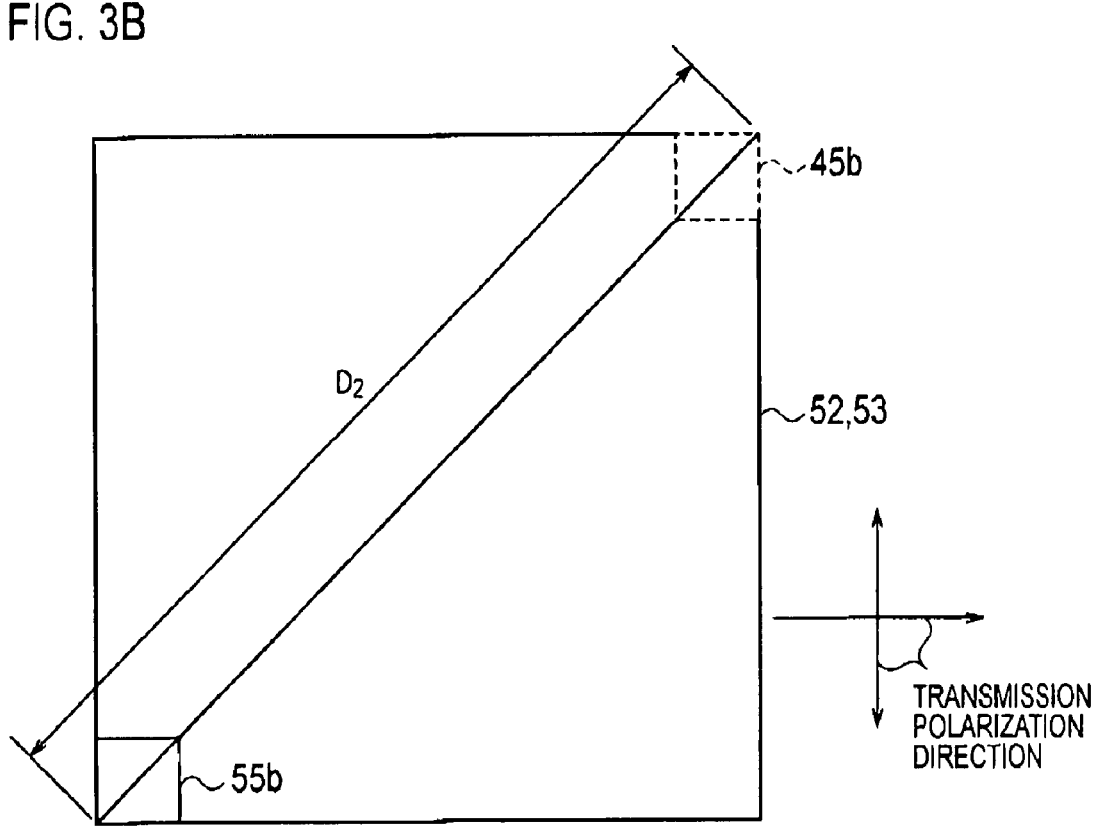

While referring to FIGS. 3A and 3B to 5, a description will be given of a light beam with the largest angle formed by the projection vector on the polarizer 52 of the light beam entering the polarizer 52 and the optical transmission polarization direction of the polarizer 52 (or polarizer 53). Additionally, a description will be given of a light beam having a component with an angle of 45° or 135° (hereinafter, referred to as a "45/135° component") formed by the projection vector of a light beam entering the polarizer 52 and the optical transmission polarization direction of the polarizer 52 (or polarizer 53). FIGS. 3A and 3B are provided for describing a light beam having a 45/135° component.

As shown in FIG. 3A, in the present embodiment, an area 55a of the polarizer 52 (or the polarizer 53) is radiated through an area 45a of the condenser lens 40 by a light beam. Here, the projection vector of the light beam is a light beam having a 45/135° component with an angle of 45° or 135° with respect to the polarization direction of the light beam allowed to pass through the polarizer 52/53. When the condenser lens 40 and the polarizer 52 (or the polarizer 53) are virtually overlapped with each other, the maximum length of a trajectory drawn by a light beam having a 45/135° component is $D_1$.

On the other hand, in the case of a conventional technique, a light beam emitted by a light source unit is of a circular or rectangular shape as shown in FIG. 3B, by which an area 55b of the pair of polarizers is radiated through the area 45b of a condenser lens. Here, the projection vector of the light beam is a light beam having a 45/135° component with an angle of 45° or 135° with respect to the polarization direction of the light beam allowed to pass through the pair of polarizers. Here, in a case where the condenser lens 40 and the pair of polarizers are virtually overlapped with each other, the maximum length of a trajectory drawn by a light beam having a 45/135° component is $D_2$.

As described above, in the first embodiment, since the light source unit 10 emits a cross shaped light beam, the length of a trajectory drawn by a light beam having 45/135° component is shorter than one in the case of a conventional technique.

Figure 4:
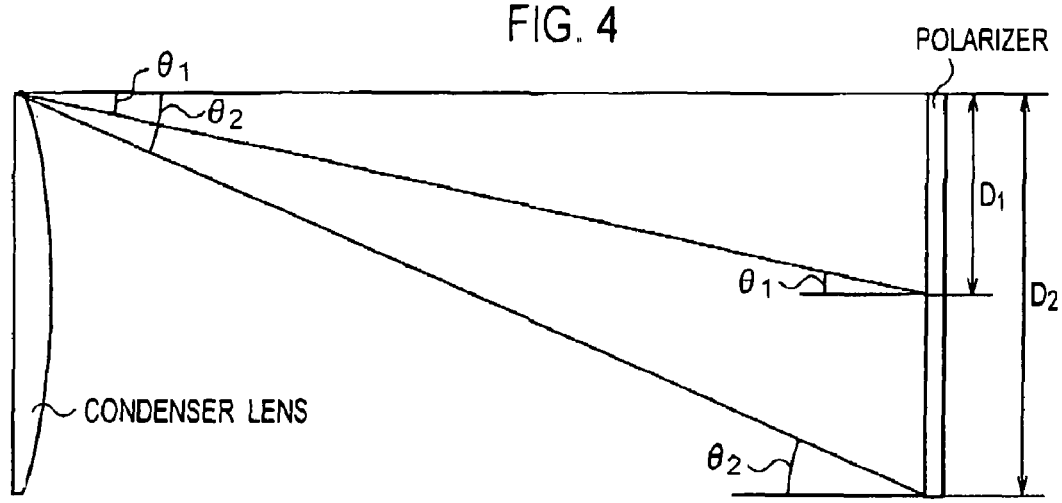
FIG. 4 is a diagram for describing incident angels formed when light beams enter a liquid crystal panel, the light beams each having a 45/135° component according to the first embodiment of the invention and the conventional technique, respectively.

Next, a description will be given of an incident angle of a light beam having a 45/135° component, among the light beams condensed by a condenser lens on a liquid crystal panel (a pair of polarizers), when the light beam enters a liquid crystal panel FIG. 4 is a diagram provided for describing the incident angle formed when a light beam having a 45/135° component enters the liquid crystal panel.

As shown in FIG. 4, in a case where a condenser lens 40 and a pair of polarizers are virtually overlapped with each other, the longer the maximum length of a trajectory drawn by a light beam having a 45/135° component is, the larger the maximum incident angle (θ) becomes, the angle being formed when the light beam of a 45/135° component enters the liquid crystal panel. Specifically, the maximum incident angle formed when a light beam enters the liquid crystal panel 50 is $\theta_1$ in the first embodiment of the invention, and the maximum incident angle formed when a light beam enters a liquid crystal panel is $\theta_2$ ($\theta_2 > \theta_1$) in the case of a conventional technique.

As described above, in the first embodiment, since the light source unit 10 emits a cross shaped light beam, the maximum incident angle $\theta_1$ formed when a light beam having a 45/135° component enters a liquid crystal panel is smaller than one in the case of a conventional technique.

Figure 5:
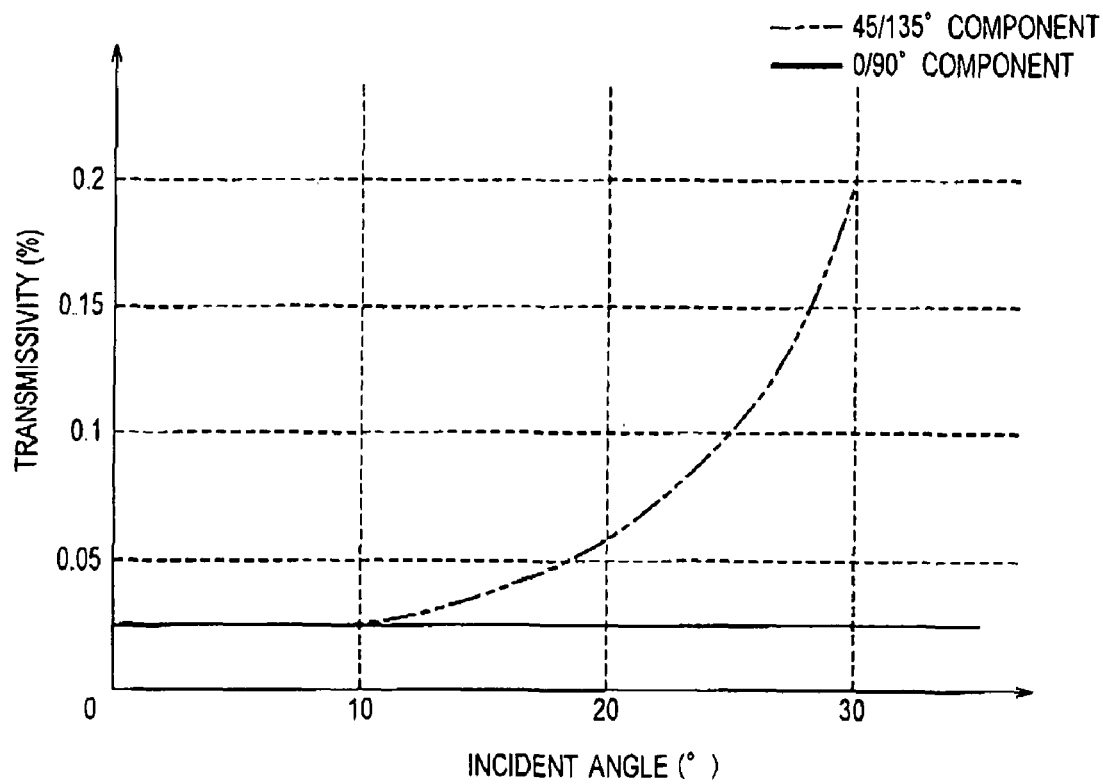
FIG. 5 is a diagram for describing transmissivities of light beams each passing through a pair of polarizers and having 0/90° and 45/135° components according to the first embodiment of the invention and the conventional technique, respectively.

Lastly, descriptions will be given of the transmissivity of each of light beams respectively having components with angles of 0° or 90° (hereinafter, referred to as a "0/90° component") and of 45° or 135° formed by the incident direction of a light beam entering a liquid crystal panel, and the polarization direction of a light beam allowed to pass through a pair of polarizers. FIG. 5 is a diagram provided for explaining the transmissivity of each of light beams respectively having 0/90° and 45/135° components, which light beams are allowed to pass through a pair of polarizers.

It is to be noted that in FIG. 5, the horizontal axis indicates incident angles formed when light beams respectively having 0/90° and 45/135° components enter a liquid crystal panel. On the other hand, the vertical axis indicates the transmissivity of each of light beams respectively having 0/90° and 45/135° components, which are allowed to pass through a pair of polarizers. Furthermore, FIG. 5 is a diagram showing relationships of incident angles and the transmissivity of each of light beams in a case where a liquid crystal panel (a pair of polarizers) is radiated with the light beams in which the polarization directions are aligned into a certain direction.

As shown in FIG. 5, as to the light beam having a 0/90° component, even when the incident angle becomes larger, the transmissivity of the light remains to be low. On the other hand, as to the light beam having a 45/135° component, when the incident angle exceeds a certain point (approximately 10°), the transmissivity of the light beam increases.

Here, from the viewpoint of obtaining a good contrast, the transmissivity of a light beam allowed to pass through a pair of polarizers is preferably small For this reason, the incident angle formed when a light beam having a 45/135° component enters the liquid crystal panel 50 is preferably not greater than approximately 10°.

In the first embodiment of the invention, as shown in FIG. 4, the incident angle formed when a light beam enters the liquid crystal panel 50 can be made small since the maximum incident angle $\theta_1$ can be made smaller than one in the case of a conventional technique. Thus, contrast in the case of the first embodiment improves as compared with that in the case of a conventional technique.

(Mechanism of Polarization Direction)

Hereinafter, a description will be given of a mechanism of a polarization direction of a light beam entering the condenser lens 40 according to the first embodiment of the present invention with reference to drawings. FIGS. 6 and 7A to 7C are diagrams provided for describing the mechanism of the polarization direction of a light beam entering the condenser lens 40, according to the first embodiment of the present invention.

Figure 6:
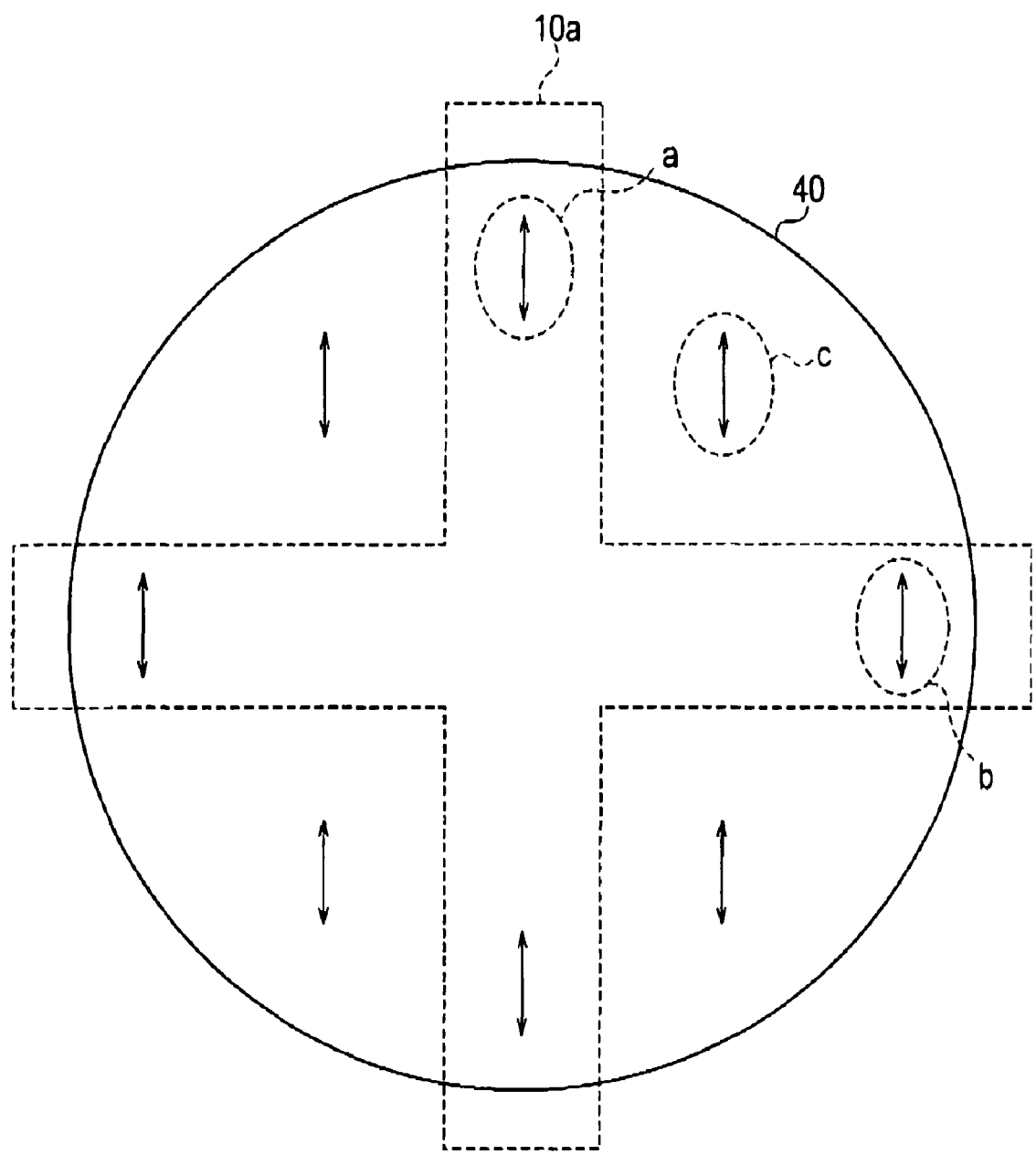
FIG. 6 is a diagram for describing mechanisms of polarization directions of light beams entering condenser lenses according to the first embodiment of the invention and the conventional technique.

As shown in FIG. 6, the condenser lens 40 is radiated with a cross shaped light beam (the light beam which has passed through the light transmission area 10a) emitted from the light source unit 10. Furthermore, as described above, the polarization directions of the light beams with which the condenser lens are radiated are aligned into a certain polarization direction.

Figure 7A:
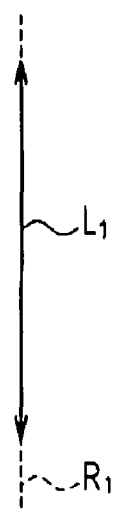
FIGS. 7A to 7C are diagrams for describing the mechanisms of light beams entering condenser lenses according to the first embodiment of the invention and the conventional technique.

As shown in FIG. 7a, the light beam with which the area a of the condenser lens 40 is radiated is a light beam $L_1$ having the certain polarization direction. The reflection surface defined by the incident light beam entering the area a and a reflection light beam reflecting at the area a is $R_1$. Here, the light beam $L_1$ entering the area a of the condenser lens 40 is a light beam having a P polarization component in parallel with the reflection surface $R_1$. Thus, the light beam $L_1$ passes directly through the area a.

Figure 7B:
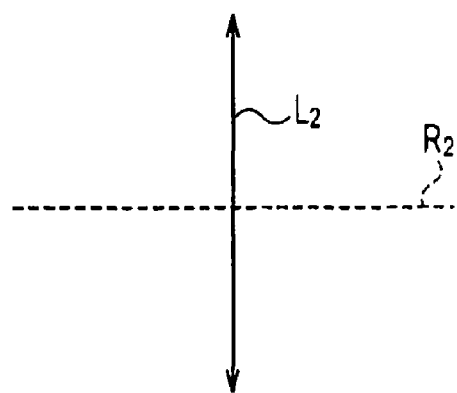
Figure 7C:
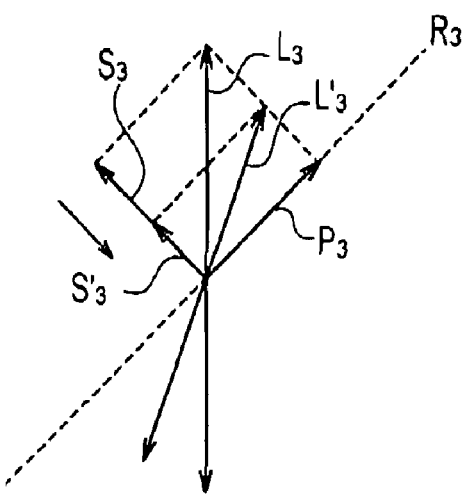

Next, as shown in FIG. 7b, the light beam with which the area b of the condenser lens 40 is radiated is a light beam $L_2$ having the certain polarization direction. The reflection surface defined by the incident light beam entering the area b and a reflection light beam reflecting at the area b is $R_2$. Here, the light beam $L_2$ entering the area b of the condenser lens 40 is a light beam having an S polarization component orthogonal to the reflection surface $R_2$. Thus, although the light beam $L_2$ is outputted from the area b while being attenuated, its polarization direction remains the same.

As shown in FIGS. 7a and 7b, in the first embodiment of the invention, since the condenser lens is radiated with cross shaped light beams, the polarization directions of the light beams outputted from the condenser lens 40 remain aligned in a certain direction.

On the other hand, in a case where the area c of the condenser lens is radiated with a light beam emitted from a light source unit as in the case of a conventional technique, the light beam entering the area c is a light beam $L_3$ having the certain polarization direction as in the cases shown in FIGS. 7a and 7b. In the meantime, since the condenser lens has a curvature, the reflection surface that is a surface defined by the incident light entering the area c and a reflection light reflected on the area c is $R_3$.

Here, the light beam $L_3$ entering the area c of the condenser lens can be considered by separating the light beam as a light beam $P_3$ having a P polarization component in parallel with the reflection surface $R_3$ and a light beam $S_3$ having an S polarization component orthogonal to the reflection surface $R_3$. In this case, although the light beam $P_3$ having a P polarization component passes directly through the area c, the light beam $S_3$ having an S polarization component becomes a light beam $S'_3$, which is the light beam outputted from the area c while being attenuated. Accordingly, a light beam $L'_3$ outputted from the area c is a sum of the light beam $P_3$ having a P polarization component and the light beam $S'_3$ having an S polarization component. As a result, the polarization component of the light beam $L'_3$ outputted from the area C becomes a direction different from the polarization direction of the light beam $L_3$ entering the area c.

As described above, in the case of a conventional technique, although polarization directions can be aligned into a certain direction by a polarization conversion device, the polarization directions are changed by a condenser lens. For this reason, it is assumed that contrast is reduced since the polarization directions of the light beams entering the liquid crystal panel are not aligned.

(Example of Projection-Type Image Display Apparatus)

Figure 8:
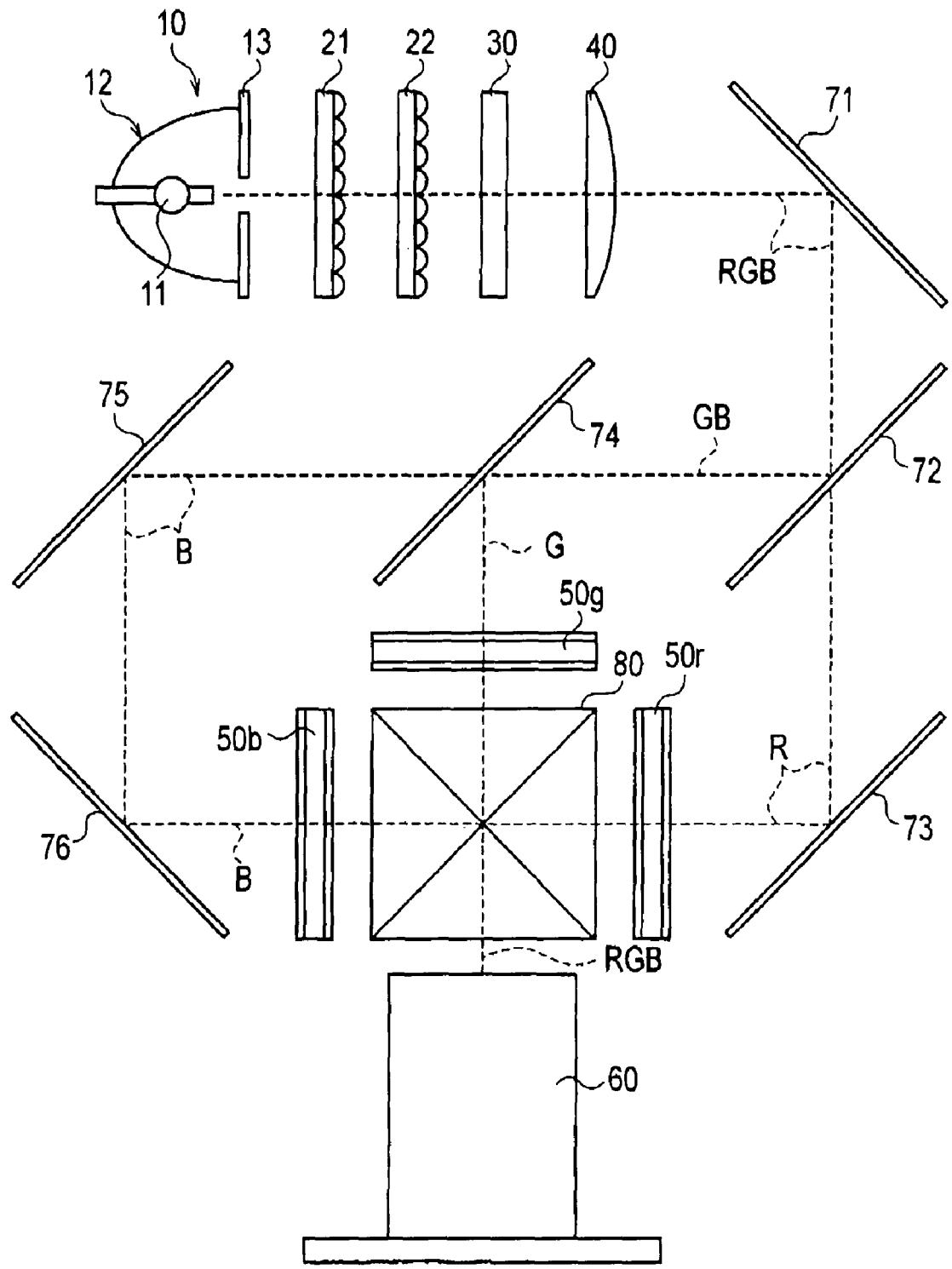
FIG. 8 is a schematic diagram showing an example of a projection-type image display apparatus 100 according to the first embodiment of the invention.

Hereinafter, a description will be given of an example of a projection-type image display apparatus according to the first embodiment of the present invention with reference to drawings. FIG. 8 is a schematic diagram showing an example of a projection type video apparatus 100 according to the first embodiment of the invention. It should be noted that although FIG. 8 exemplifies a projection-type image display apparatus of a three-plate type, the invention is not limited to this.

As shown in FIG. 8, the projection-type image display apparatus 100 includes a light source unit 10, a fly-eye lens 21, a fly-eye lens 22, a polarization conversion device 30, a condenser lens 40, a plurality of liquid crystal panels 50 (a liquid crystal panel 50r, a liquid crystal panel 50g and a liquid crystal panel 50b) and a projection lens 60 in addition to mirrors 71 to 76 and a dichroic prism 80.

The mirror 71 is a turning mirror that reflects all of light beams emitted from the light source unit 10. The mirror 72 is a dichroic mirror, which allows only a red color light beam to pass through, and which reflects green and blue color light beams. The mirror 73 is a turning mirror that reflects the red color light beam that has passed through the mirror 72. The mirror 74 is a dichroic mirror which allows only the blue color light beam reflected by the mirror 72 to pass through, and which reflects the green color light beam reflected by the mirror 72. The mirror 75 is a turning mirror that reflects the blue color light beam having transmitted through the mirror 74. The mirror 76 is a turning mirror that reflects the blue color light beam reflected by the mirror 75. The dichroic prism 80 synthesizes light beams which have passed through each of the liquid crystal panels 50 (the liquid crystal panel 50r, the liquid crystal panel 50g and the liquid crystal panel 50b) and then outputs the synthesized light beam to the projection lens 60 side.

As described above, the configuration shown in FIG. 1 can be applied to various projection-type image display apparatuses.

It should be noted that in this description, the polarizers (polarizers 52 and 53) are defined as ones each including a retardation film. Accordingly, in a case where a configuration including a polarizer and a retardation film independently is considered, there is a case where the polarization directions (transmission axes) of light beams respectively passing through the polarizers 52 and 53 match with each other. However, it should be noted that in the present description, polarizers and retardation films are considered to be not independently included in the configuration.

Effect and Advantage

According to the projection-type image display apparatus 100 in the case of the first embodiment of the present invention, since the light source unit 10 emits a cross shaped light beam, the maximum incident angle formed when a light beam having a 45/135° component entering the liquid crystal panel 50 (the polarizer 52 or 53) can be made small. Thereby, the projection-type image display apparatus 100 is capable of achieving an improvement in black and white contrast.

In addition, according to the projection-type image display apparatus 100 in the case of the first embodiment of the invention, since the condenser lens 40 is radiated with a cross shaped light beam emitted from the light source unit 10, it is possible to inhibit the polarization directions aligned into a certain direction by the polarization conversion device 30 (PBS) from being changed by a curvature of the condenser lens 40. As a result, the projection-type image display apparatus 100 is capable of achieving an improvement in black and white contrast.

Furthermore, according to the projection-type image display apparatus 100 in the case of the first embodiment of the present invention, since each of the surfaces of the cross shaped mask 13 facing the reflector 12 of the light source unit 10 is configured of a reflective surface, it is possible to inhibit the occurrence of a reduction in luminance caused by including the cross shaped mask 13

Second Embodiment

Hereinafter, a description will be given of a second embodiment of the present invention with reference to drawings. It should be noted that the description hereinafter is mainly given of a difference between the aforementioned first embodiment and the second embodiment.

Specifically, while the light source unit 10 in the aforementioned first embodiment is configured of the light source 11, the reflector 12 and the cross shaped mask 13, in the second embodiment, the light source unit is configured of solid-state light sources (LEDs; Light Emitting Diodes, LDs; Laser Diodes) arranged in a cross shape.

(Configuration of Light Source Unit)

Figure 9:
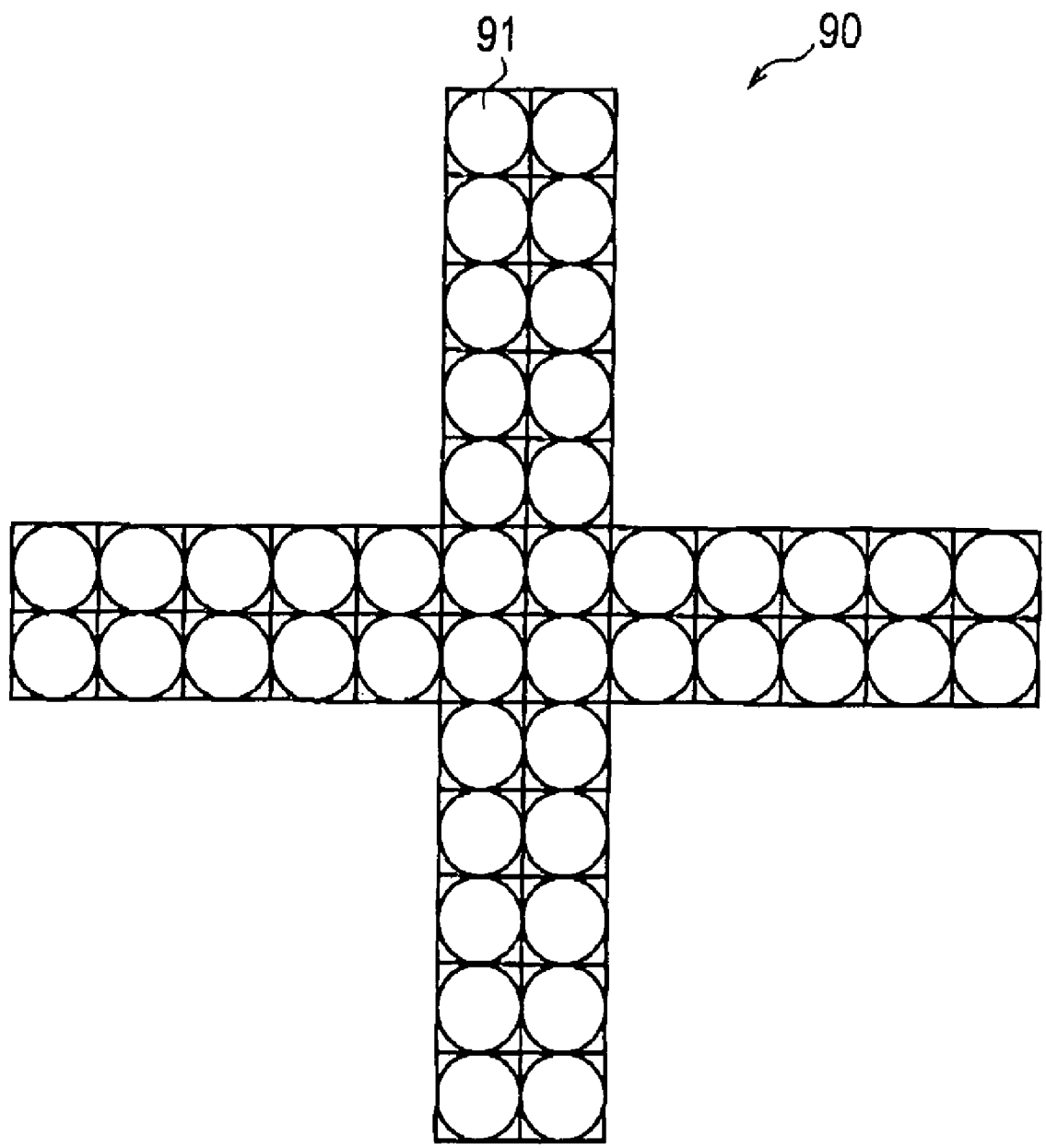
FIG. 9 is a diagram showing a configuration of a light source unit 90 according to a second embodiment of the invention.

Hereinafter, a description will be given of the configuration of the light source unit according to the second embodiment with reference to drawings. FIG. 9 is a diagram showing a configuration of a light source unit 90 according to the second embodiment. As shown in FIG. 9, the light source unit 90 includes a plurality of LEDs 91. The LEDs 91 are arranged in a cross shaped manner with some degree of directivity.

In addition, the plurality of LEDs 91 are arranged in a crossed shape extending in the polarization direction of a light beam allowed to pass through a pair of polarizers (polarizers 52 and 53).

(Example of Projection-Type Image Display Apparatus)

Figure 10:
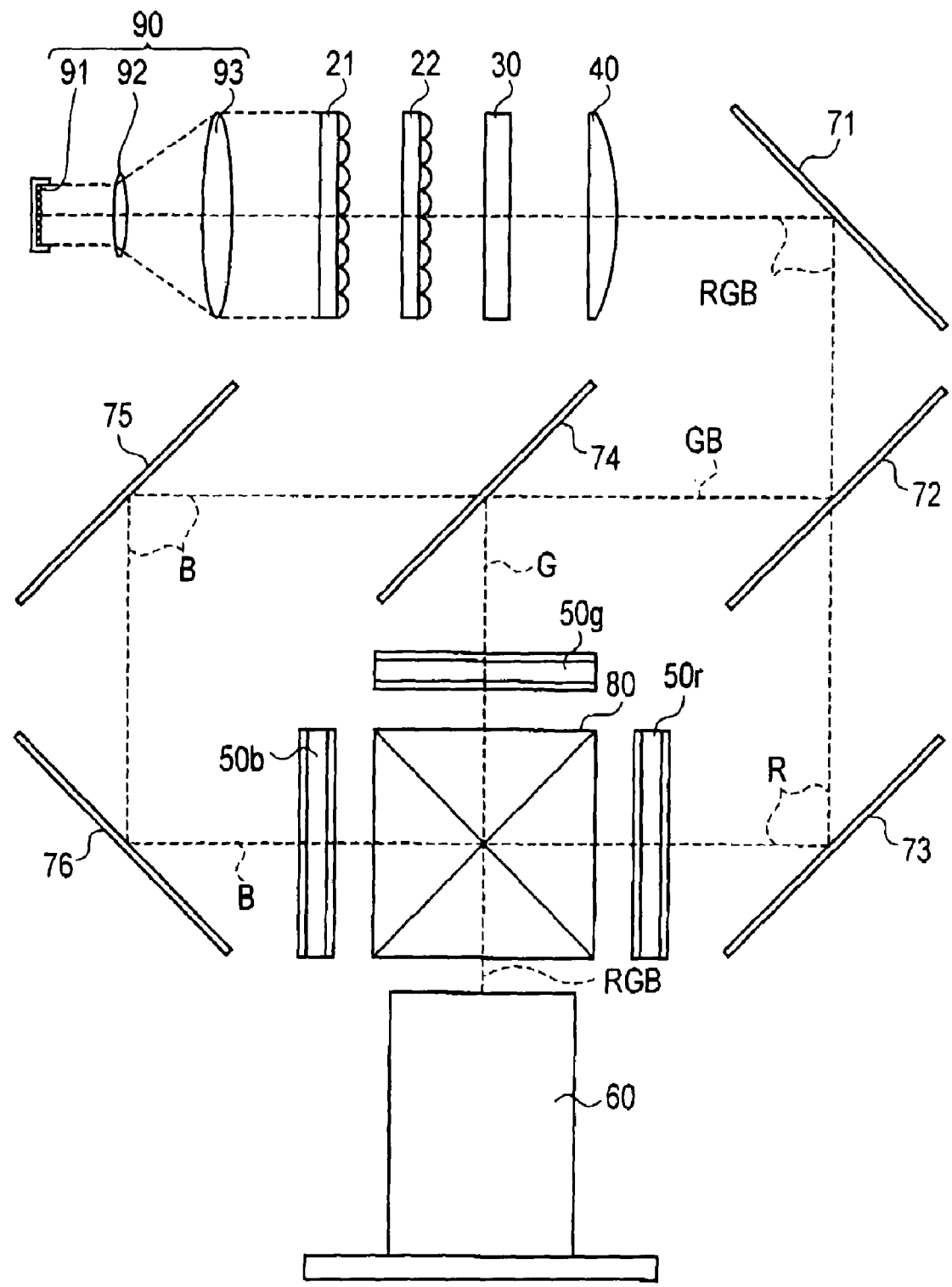
FIG. 10 is a schematic diagram showing an example of a projection-type image display apparatus 100 according to the second embodiment of the invention.

Hereinafter, a description will be given of an example of the projection-type image display apparatus according to the second embodiment of the invention with reference to drawings. FIG. 10 is a schematic diagram showing an example of a projection-type image display apparatus 100 according to the second embodiment of the invention. It should be noted that the same components as the ones shown in FIG. 8 are denoted by the same reference numerals in FIG. 10.

As shown in FIG. 10, the projection-type image display apparatus 100 includes the light source unit 90 in place of the light source unit 10. The light source unit 90 includes a lens 92 and a lens 93 in addition to the aforementioned plurality of LEDs 91.

The lenses 92 and 93 constitute a relay system, which images cross shaped light beams emitted from the LEDs 91 on the incident surface of the fly-eye lens 21. Specifically, the lenses 92 and 93 form an image surface on the incident surface of the fly-eye lens 21 with the light source unit 90 as a physical surface.

Third Embodiment

Hereinafter, a description will be given of a third embodiment of the invention with reference to drawings. It should be noted that the description hereinafter is mainly given of a difference between the aforementioned first embodiment and the third embodiment.

Specifically, while the light source unit 10 in the first embodiment emits a cross shaped light beam, a light source in the third embodiment emits light beams having optical axes each located in one of arms of a crossed shape.

(Configuration of Light Source Unit)

Figure 11:
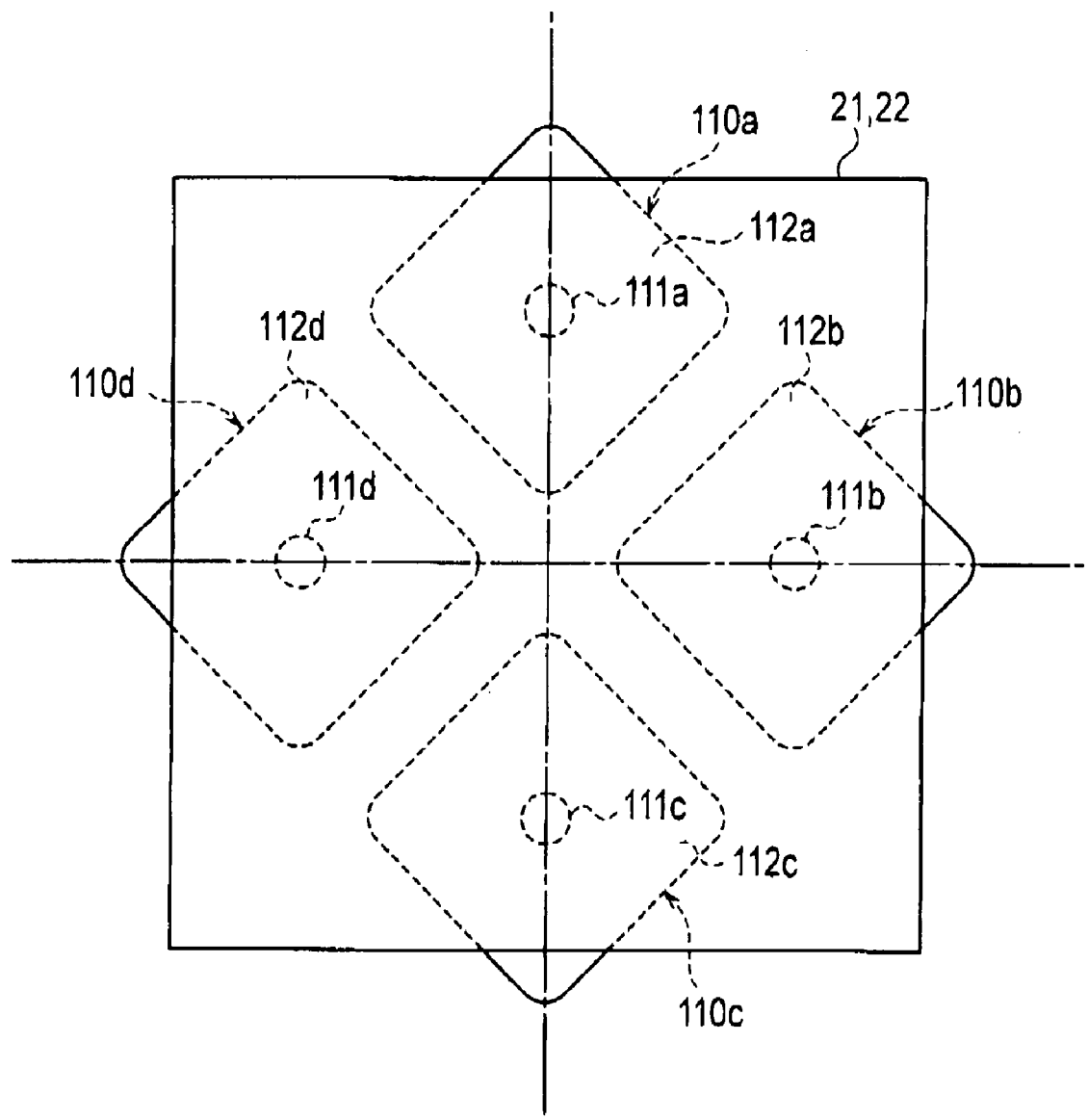
FIG. 11 is a diagram showing a configuration of a light source unit 110 according to a third embodiment of the invention.
Figure 11:
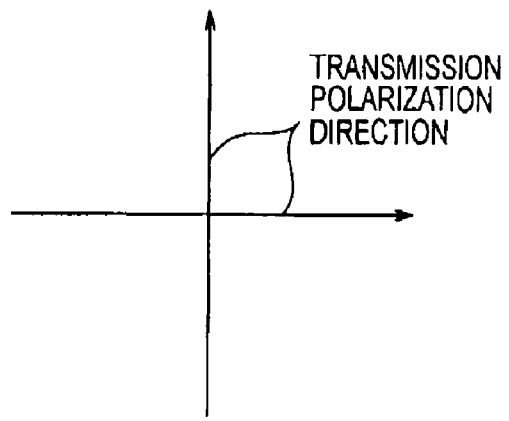

Hereinafter, a description will be given of a configuration of the light source units according to the third embodiment of the invention with reference to drawings. FIG. 11 is a diagram showing the configuration of a light source unit 110 according to the third embodiment of the invention.

As shown in FIG. 11, the light source unit 110 includes a plurality of light sources 111a to 111d and a plurality of reflectors 112a to 112d. Moreover, the optical axes of the light sources (light sources 111a to 111d) are located in a cross shape extending in the polarization directions of light beams allowed to pass through the pair of polarizers (polarizers 52 and 53).

As described above, when the optical axes of the light sources (light sources 111a to 111d) are located in a cross shape, the amount of light in the cross shaped light beam becomes greater than the amount of light in other areas. Thus, the present invention can be effectively applied to the projection-type image display apparatus 100.

Fourth Embodiment

Hereinafter, a description will be given of a fourth embodiment of the invention with reference to drawings. Specifically, variations of the light source units will be described with reference to FIGS. 12A to 12C.

Figure 12A:
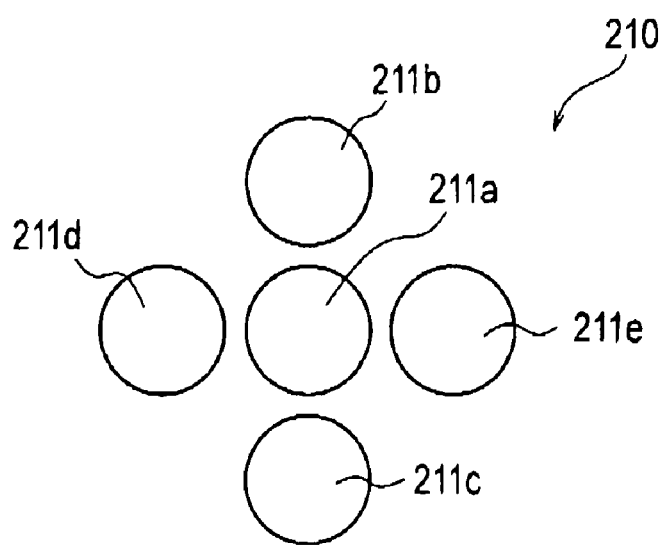
FIGS. 12A to 12C are diagrams showing examples of light source units.

As shown in FIG. 12A, a light source unit 210 may be configured of five lump light sources 211 (lump light sources 211a to 211e). The lump light source 211a is provided in the middle of the light source unit 210. The lump light sources 211b and 211c are provided on the upper side and the lower side of the lump light source 211a. The lump light sources 211d and 211e are provided on the left side and the right side of the lump light source 211a.

Figure 12B:
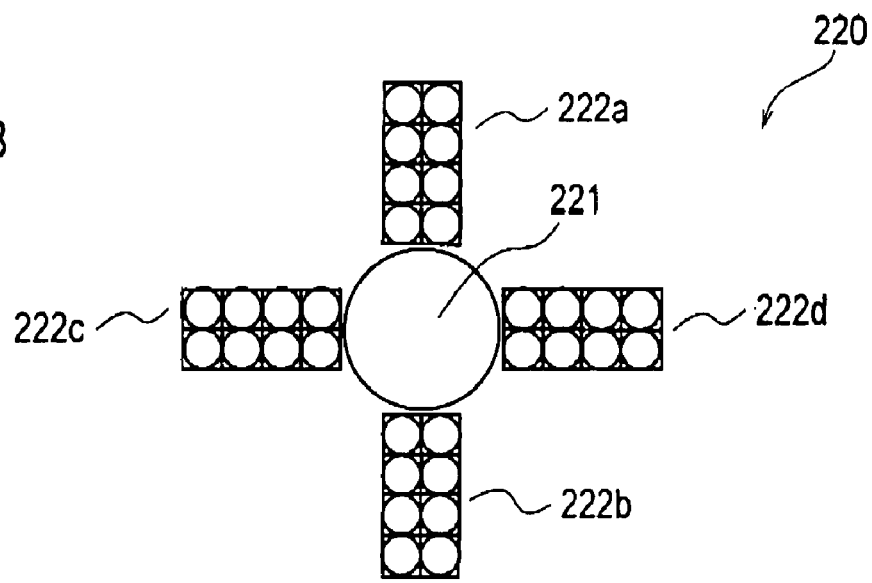

As shown in FIG. 12B, a light source unit 220 may be configured of a lump light source 221 and a plurality of solid-state light source groups 222 (solid-state light source groups 222a to 222d). The lump light source 221 is provided in the middle of the light source unit 220. The solid-state light source groups 222a and 222b are configured of a plurality of solid-state light sources, and provided upward and downward from the lump light source 221. The solid-state light source groups 222c and 222d are configured of a plurality of solid-state light sources, and provided leftward and rightward from the lump light source 221.

Figure 12C:
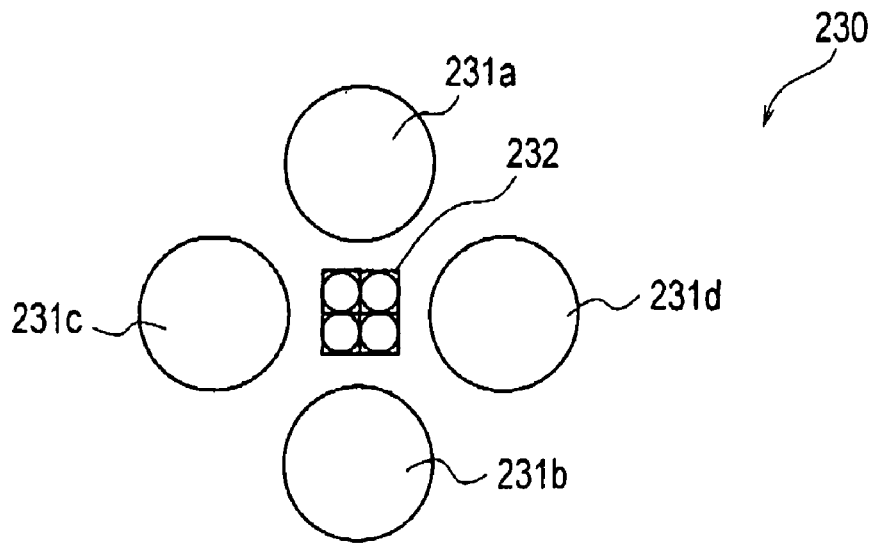

As shown in FIG. 12C, a light source unit 230 may be configured of a plurality of lump light sources 231 (lump light sources 231a to 231d) and a solid-state light source group 232. The lump light sources 231a and 231b are provided on the upper side and the lower side of the solid-state light source group 232. The lump light sources 231c and 231d are provided on the left side and the right side of the solid-state light source group 232. The solid-state light source group 232 is configured of a plurality of solid-state light sources, and provided in the middle of the light source unit 230.

It should be note that, the solid-state light source group may be configured of single solid-state light source in the FIGS. 12B and 12C.

Here, in the light source unit where the lump light source and the solid-state light source are integrated, expansion degree of the light emitted from the light source provided on the outer side of the light source unit is preferably smaller than expansion degree of the light emitted from the light source provided in the middle of the light source unit.

Thereby, the light beam having cross shape is hard to lose its shape.

The expansion degree of the light emitted from the light source may be represented as "Etendue=$2\pi s(1 \cdot \cos \square)$", for example. Note that, "$\pi$" denotes radius of a sphere where the light source is located at the center, "s" denotes light emitting area of the light source. "$2\pi(1 \cdot \cos \square)$" denotes a solid angle of the light emitted form the light source.

Other Embodiments

Although the present invention has been described in the cases of the aforementioned embodiments, the description and drawings partially constituting this disclosure should not be understood as ones that impose a limitation on the present invention. From the descriptions in this disclosure, various alternative embodiments, examples and operation techniques will be apparent to those skilled in the art.

For example, a three-plate type projection-type image display apparatus is used as the projection-type image display apparatus 100 in the aforementioned first and second embodiments (FIGS. 8 and 10). However, the present invention is not limited to this. A single-plate type projection-type image display apparatus may be used.

Moreover, although the light transmission area 10a is formed by arranging the plurality of cross shaped mask 13 (pieces of cross shaped masks 13a to 13d) while placing a cross shaped space at the center of the masks in the first embodiment, the present invention is not limited to this. For example, the light transmission area 10a can be formed by a single piece of cross shaped mask 13. In addition, the light transmission area 10a may be formed by attaching a reflection mirror to a single piece of glass plate.

Furthermore, in the aforementioned embodiments, the liquid crystal panel 50 is a transmissive liquid crystal panel. However, the present invention is not limited to this. Specifically, the liquid crystal panel 50 may be a reflective liquid crystal panel.

In the second embodiments, the explanation is given by using the LED as an example of the solid-state light source. However, the present invention is not limited to this. Specifically, the solid-state light source may be a LD (laser diode).

What is claimed is:

1. A projection-type image display apparatus comprising:
   a light source unit;
   an optical modulator including an incident surface and an output surface both being substantially perpendicular to an optical axis of a light beam emitted from the light source, and configured to modulate a light beam emitted from the light source_with improved contrast;
   a first polarizer provided to the incident surface of the optical modulator; and
   a second polarizer provided to the output surface of the optical modulator, wherein the polarization direction of a light beam allowed to pass through the first polarizer and the polarization direction of a light beam allowed to pass through the second polarizer are substantially orthogonal to each other or are substantially matched with each other,
   a condenser lens positioned within the optical axis and at a predetermined distance from the light source unit so as to retain the cross-sectional shape of the light beam emitted from the light source unit at the condenser lens and
   the light source unit emits a cross shaped light beam, thereby achieving improved contrast.

2. The projection-type image display apparatus according to claim 1, further comprising:
   a fly-eye lens including a plurality of micro lenses arranged in an array, and configured to collect light beams emitted from the light source unit;
   a polarization conversion device configured to align the polarization directions of light beams collected by the plurality of micro lenses into a certain polarization direction;
   wherein the condenser lens is configured to condense, on the incident surface of the optical modulator, the light beams with the polarization directions aligned in the certain direction by the polarization conversion device.

3. The projection-type image display apparatus according to claim 1, wherein the light source unit includes:
   a light source configured to emit a light beam;
   a reflector configured to reflect a light beam emitted from the light source to the optical modulator side; and
   a cross shaped mask having a cross shaped light transmission area, arranged between the light source and the optical modulator on the optical axis of a light beam emitted from the light source and,
   wherein a surface of the cross shaped mask facing the reflector is configured of a reflective surface reflecting a light beam.

4. The projection-type image display apparatus according to claim 1, wherein the light source unit is configured of a plurality of solid-state light sources arranged in a cross shape.

5. The projection-type image display apparatus according to claim 1, wherein the light source unit is configured to emit light beams having optical axes each located in one of arms of a crossed shape.

6. The projection-type image display apparatus according to claim 1, wherein the light source unit is configured to emit a cross shaped light beam extending in the polarization direction of a light beam allowed to pass through the first polarizer, and in the polarization direction of a light beam allowed to pass through the second polarizer.

* * * * *